US009213519B2

(12) United States Patent
Walls et al.

(10) Patent No.: US 9,213,519 B2
(45) Date of Patent: Dec. 15, 2015

(54) SYSTEMS AND METHODS FOR EVALUATING THE OPERATION OF A MULTI-NODE GRAPHICS SYSTEM

(75) Inventors: Jeffrey Joel Walls, Fort Collins, CO (US); Donley Byron Hoffman, Fort Collins, CO (US); Byron Alan Alcorn, Fort Collins, CO (US)

(73) Assignee: Hewlett-Packard Development Company L.P., Houston, TX (US)

( * ) Notice: Subject to any disclaimer, the term of this patent is extended or adjusted under 35 U.S.C. 154(b) by 2218 days.

(21) Appl. No.: 11/067,980

(22) Filed: Feb. 28, 2005

(65) Prior Publication Data

US 2006/0209077 A1    Sep. 21, 2006

(51) Int. Cl.
*G06F 3/14*    (2006.01)
*G09G 5/00*    (2006.01)

(52) U.S. Cl.
CPC .............. *G06F 3/1438* (2013.01); *G09G 5/006* (2013.01); *G09G 2360/18* (2013.01); *G09G 2370/04* (2013.01)

(58) Field of Classification Search
CPC .............. G06F 3/1438; G06F 2360/18; G06F 2370/04; G06F 5/006
USPC ........................................................ 709/205
See application file for complete search history.

(56) References Cited

U.S. PATENT DOCUMENTS

| | | | |
|---|---|---|---|
| 4,903,218 A | 2/1990 | Longo et al. | |
| 5,592,657 A | 1/1997 | Johnson et al. | |
| 5,757,385 A * | 5/1998 | Narayanaswami et al. | 345/505 |
| 5,861,893 A * | 1/1999 | Sturgess | 345/562 |
| 6,378,014 B1 | 4/2002 | Shirley | |
| 6,567,869 B2 | 5/2003 | Shirley | |
| 6,701,380 B2 | 3/2004 | Schneider et al. | |
| 8,427,421 B2 * | 4/2013 | Lee et al. | 345/156 |
| 2002/0085007 A1 * | 7/2002 | Nelson et al. | 345/505 |
| 2002/0198934 A1 | 12/2002 | Kistler et al. | |
| 2003/0033362 A1 | 2/2003 | King et al. | |
| 2003/0092437 A1 | 5/2003 | Nowlin et al. | |
| 2003/0112333 A1 * | 6/2003 | Chen et al. | 348/192 |
| 2003/0158886 A1 * | 8/2003 | Walls et al. | 709/201 |
| 2003/0164834 A1 * | 9/2003 | Lefebvre et al. | 345/506 |
| 2003/0179208 A1 | 9/2003 | Lavelle | |
| 2004/0169657 A1 * | 9/2004 | Morgan et al. | 345/501 |
| 2004/0174385 A1 * | 9/2004 | Ikeda et al. | 345/629 |

OTHER PUBLICATIONS

Presentation entitled "sv7: Blazing Visualization on a Commodity Cluster" by Byron Alcorn, hp invent, Jul. 2003, 23 pages.

* cited by examiner

*Primary Examiner* — Joe Chacko
(74) *Attorney, Agent, or Firm* — Hewlett-Packard Patent Department

(57) ABSTRACT

Embodiments of the present invention are broadly directed to novel systems and methods for evaluating a performance aspect in a multi-computer graphics system. One embodiment comprises selection logic capable of enabling a user to specify at least one render node for selection and generating logic associated with the compositor for generating the composite output signal, the generating logic being capable of eliminating, from at least a portion of the composite output signal, content from the video signals from all render nodes not specified for selection.

20 Claims, 9 Drawing Sheets

SYSTEMS AND METHODS FOR EVALUATING THE OPERATION OF A MULTI-NODE GRAPHICS SYSTEM

BACKGROUND

The rendering of three-dimensional computer graphics is a computationally intensive process. In many high-end applications, three-dimensional computer graphics are rendered using a pool or cluster of computers that share the processing responsibilities. In such a system, one computer may be configured to execute at least one application program and communicate graphics data to other computers for rendering. In this regard, a collection of computers may be configured to cooperatively render a graphics image and may receive the graphics data to be rendered from the computer executing the application program.

When multiple computers (or nodes) are used to render a single scene, the video signals generated by each of those computers are combined into a single aggregate (or composite) signal and encoded in a particular format, such as digital RGB (Red Green Blue), NTSC (National Television Standards Committee), PAL (phase alteration by line), etc. There exist devices called compositors that perform the function of combining (or compositing) multiple video signals into a single, composite video signal.

In virtually any computer system, there exists a need to effectively debug and troubleshoot problems that may arise. A computer system console is one mechanism used to do this. A computer system console is a device used to interact with the system at a lower level. The console differs from terminal devices (sometimes referred to as TTYs) in that the console is functional in virtually all modes of operation, whereas systems can be configured to run without terminals in some, or all, operating modes. In addition, the console is one of the very first devices activated in the boot sequence so that the system administrator can observe and control system operations as early as possible.

The need to effectively troubleshoot and debug system operation of complex, multi-computer systems is even more important. In multi-computer graphics-rendering systems, such as that described above, when a composite graphics image is not rendered correctly, it can be more difficult to determine which of the cooperating computers (or render nodes) is not properly functioning. Consequently, the debug or troubleshooting effort can be two-fold: (1) determining which computer is not correctly performing; and (2) determining, specifically, what is the performance or functioning problem.

Console managers provide the console function among a plurality of shared or coupled computers over a common network. In this regard, a console manager is a single interface that provides a user (e.g., service person) console access to each computer on the network, via network communications. A problem, however, with existing single-computer consoles and multi-computer console managers is that console access is limited to interaction outside the graphics or windowing environments. That is, information exchanged through the console manager is limited to ASCII or text information. In a graphics environment (such as Windows), the console manager cannot be used to communicate information.

DESCRIPTION OF THE DRAWINGS

The accompanying drawings incorporated in and forming a part of the specification, illustrate several aspects of the present invention, and together with the description serve to explain the principles of the invention. In the drawings.

DETAILED DESCRIPTION

There is a need for a system and method of effectively troubleshooting system operations or to evaluate performance aspects in a multi-computer graphics system.

Figure 1:
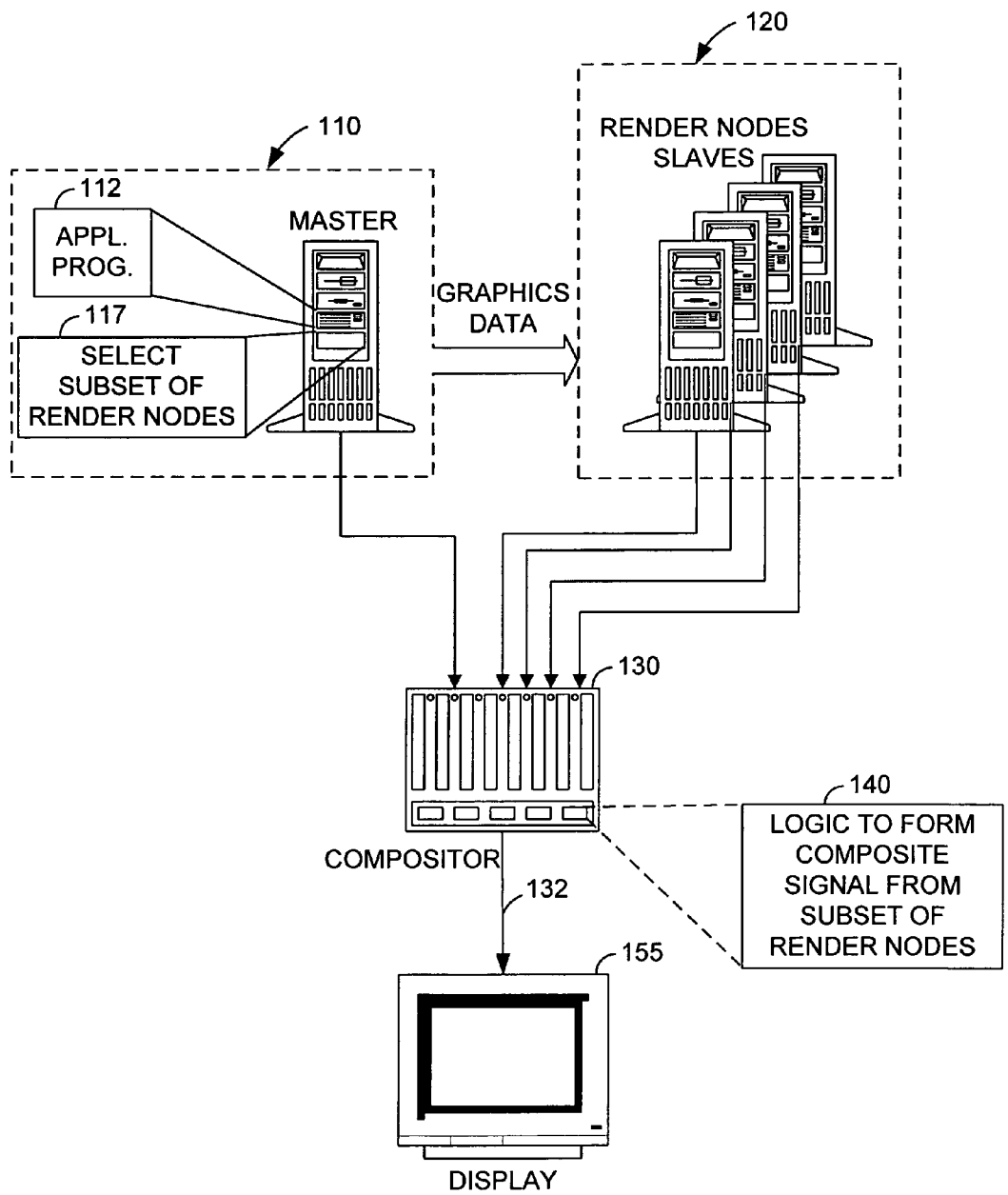
FIG. 1 is a diagram illustrating various components in a graphics system constructed in accordance with one embodiment of the present invention.

Reference is now made to the drawings, in which FIG. 1 illustrates a computing environment in which one embodiment of the present invention resides and operates. Many high-end or intensive graphic programs are executed, and graphics images are rendered, using a plurality of computers in combination. There are various ways in which multiple computers may be configured to operate either in parallel or in conjunction to perform a graphics-rendering task. One way is to configure one computer 110 to operate as a master, and configure the remaining plurality of computers 120 to operate as slaves. In the illustrated embodiment, the slave computers 120 are configured to collectively render a three-dimensional graphics image. The rendering among the slave computers 120 can be allocated or partitioned in a variety of ways. One way is to partition the screen space into various partitions and have each slave computer render the data associated with its partition. Another way is to partition the graphics data into layers and have each slave 120 render one or more layers. Yet another way is to allocate tasks and responsibilities to different slave computers (e.g., texture mapping to one slave computer, pixel shading to another slave computer, etc.).

In the embodiment illustrated in FIG. 1, the master computer 110 executes an application program 112 that involves the rendering of three-dimensional graphics. The control and functionality of the application program 112 is handled by the master computer 110. As well, the master computer 110 handles various two-dimensional graphics rendering that is incidental to the execution of the application program 112. For example, the presentation of drop-down menus or other items of presentation that do not require three-dimensional rendering is performed by the master computer 110. Each of the computers (master computer 110 and each of the slave computers 120) comprises a graphics card (or other graphics circuitry) that outputs a signal for a video display 140. Since, however, the content that is rendered by each of the computers must first be combined, the video outputs of each of the computers are delivered to a compositor 130. A compositor 130 operates to combine the content of each of the plurality of input video signals to deliver a single, composite output signal 132 that is used to drive a display device 140.

Consistent with the scope and spirit of the embodiments described herein, an alternative environment comprises multiple displays 140 that are configured to operate as a single logical display. There are a variety of applications in which graphics information is presented over a panel or matrix of displays, to effectively emulate a single, large display. Examples of such systems include: real estate, financial (such as the stock market), control room, large engineering processes, military mapping, telecommunications, etc. Such systems require the output of large amounts of data, which can easily exceed the viewable display capacity of a single, physical monitor (a user could view relevant data only by panning and zooming). The implementation and management of such systems emulating a single display through multiple displays is well known and need not be described herein.

In a system environment such as that of FIG. 1, the computer 110 executing the graphics application program communicates to the cluster of render nodes 120 the relevant data utilized for carrying out the rendering operations. The structure and content of such data will be known and appreciated by persons skilled in the art, as it is the underlying data specifying primitives, texture, lighting, shading, and other aspects employed for rendering a given graphics image. In one embodiment, such information is communicated by the master 110 to the individual slave computers as appropriate, based upon the partitioned operation of the slave units. In other embodiments, the data is communicated to a defined slave computer that is running a process or program that would further subdivide and allocate the underlying graphics information to individual slave nodes for processing.

It should be appreciated that each slave 120 operates substantially independent from the other slave computers, insofar as the graphics information output from the video outputs of each is not synchronized (from a timing standpoint) with the other render nodes. In this regard, a mechanism is provided for efficiently synchronizing the video signals input to the compositor 130. This is accomplished by identifying new frames of video or graphics information communicated from the render nodes 120 to the compositor 130. One way of implementing such a feature is described in co-pending application Ser. No. 10/899,961, filed Jul. 27, 2004, the contents of which are hereby incorporated by reference in its entirety.

In one embodiment, the render nodes 120 comprise graphics cards that output video signals in accordance with the digital video interface (DVI) specification. As is known, the DVI specification defines a high-speed digital interface. TMDS (transition-minimized differential signaling) takes the signal from the graphics adapter, determines the resolution and refresh rate that the monitor is using and spreads the signal out over the available bandwidth to optimize the data transfer from computer to monitor. DVI is technology-independent, which enables video or graphic data output over DVI to properly perform with wide variety of displays and graphics cards.

Logic 117 is also provided to enable a user to conveniently select or identify a subset (which may be only one or more) of render nodes for viewing. When selected, the outputs of the selected render nodes are delivered to the compositor 130, and the video signals of those selected render node(s) are combined to form a composite signal for display. This feature is particularly useful when a user desires to evaluate or exclude the contribution of a specified render node (or nodes) to the resulting graphics image. Correspondingly, logic 140 is provided in the compositor for forming a composite signal (to output to a display 155) from the video signals output from only a subset of the render nodes. It should be appreciated that, consistent with the structure and methodology summarized above, a variety of particular implementations is realized, in accordance with the scope and spirit of the embodiments described herein.

Figure 2:
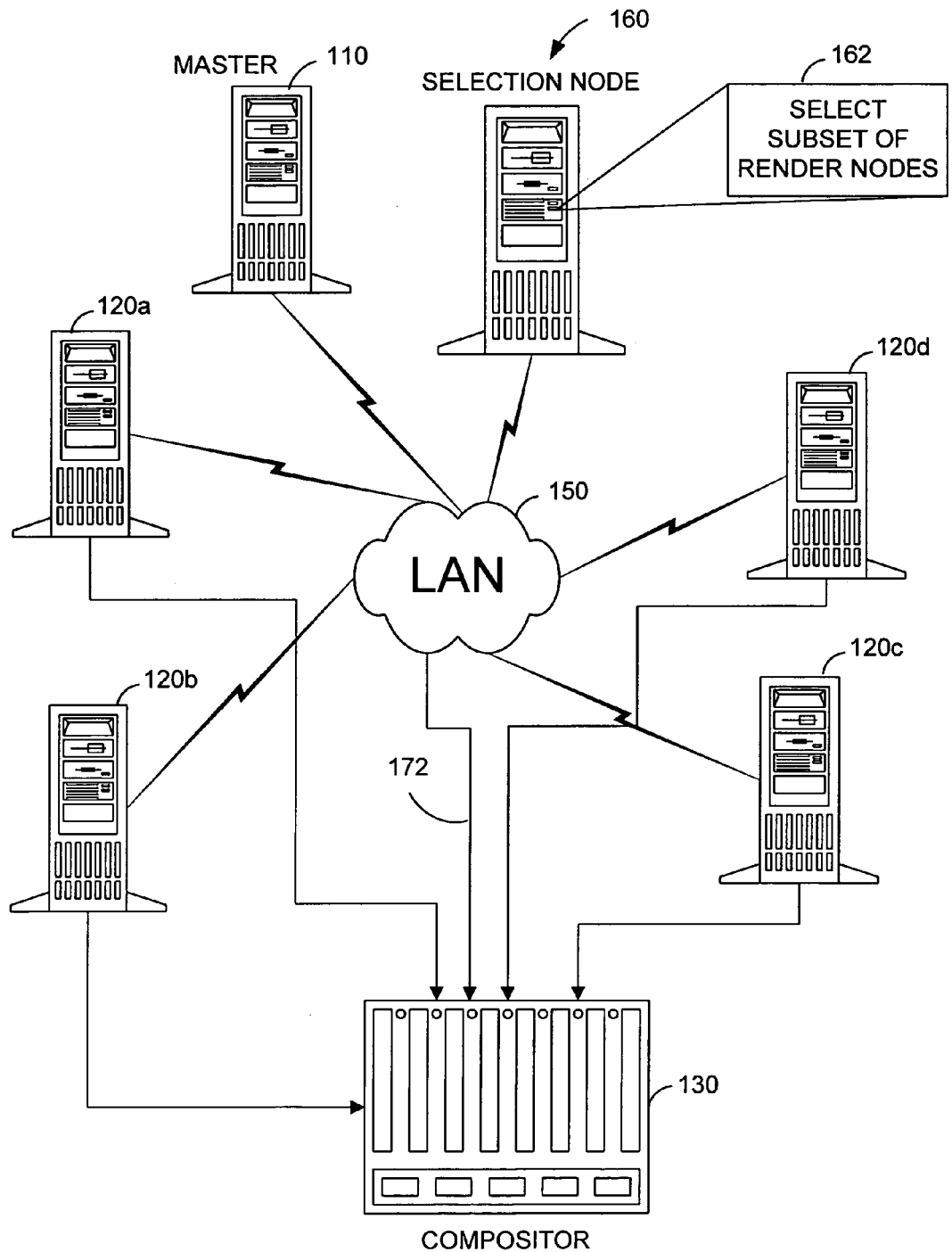
FIG. 2 is a diagram, similar to FIG. 1, illustrating an alternative embodiment of the present invention.

Reference is now made to FIG. 2, which is a system-level diagram illustrating components that function similar to those described in connection with FIG. 1. In this regard, a plurality of render nodes 120a-120d are provided to collectively render a graphics image. Each render node 120a-120d has a video output that is directed to a compositor 130. The render nodes of FIG. 2, in all relevant respects, operate like the render nodes of FIG. 1. Although only four such nodes have been illustrated herein, it will be appreciated that fewer or additional such nodes may be provided in accordance with the scope and spirit of the present invention. Communication between the master node 110 and the plurality of render nodes 120a-120d may take place across a local area network (LAN) 150 or, alternatively, may take place across a direct coupling.

In addition to the master node 10 and plurality of render nodes 120a-120d, an additional node 160 is illustrated. Node 160 comprises selection logic 162, which performs the function of the selection logic 117 of FIG. 1. The node 160 and selection logic 162 have been illustrated in FIG. 2 as a separate computer (or node), coupled to the LAN 150 in virtually any location on the LAN 150. Of course, in many embodiments, the coupling of the node 160 possessing the selection logic 162 will likely be in close proximity to the display 140, as the user of the node 160 will likely be a person performing a troubleshooting operation or otherwise evaluating certain performance aspects of the graphics system that are manifest or otherwise evident in the visual display.

FIG. 2 also shows a communication link 172 between the LAN 150 and the compositor 130. Identification of the render node or render nodes that are selected for separate or special viewing are communicated from the node 160 to the compositor 130 via the LAN 150 and link 172. Alternatively, identification of the render node or render nodes that are selected for separate or special viewing may be communicated from the node 160 via a direct connection to the compositor 130. Further, it should be appreciated that, in some embodiments, the master node 110 is utilized as the selection node.

Figure 3:
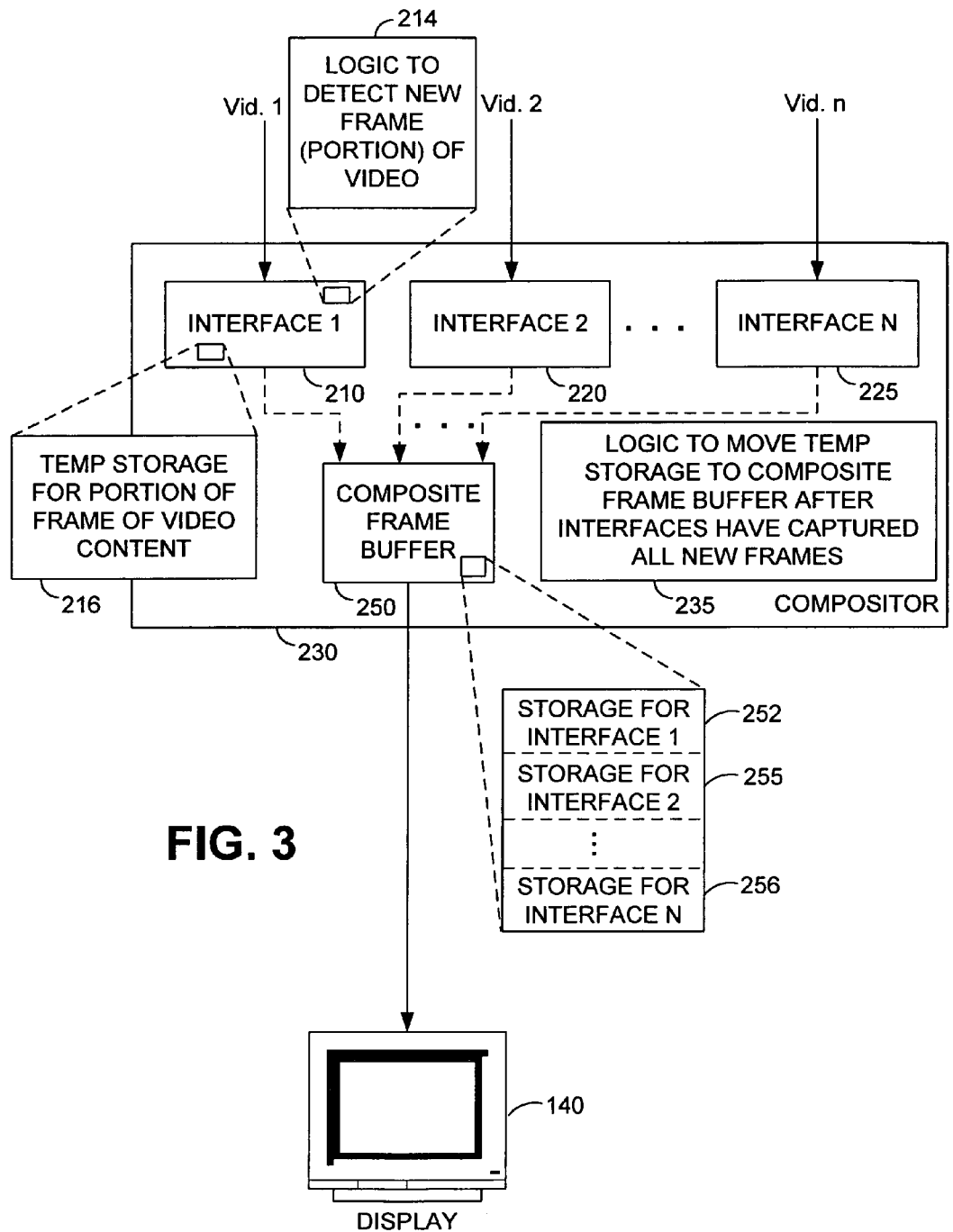
FIG. 3 is a diagram illustrating certain components within a compositor constructed in accordance with an embodiment of the present invention.

Reference is now made to FIG. 3, which illustrates several features relevant to the structure and operation of a compositor 230, constructed in accordance with an embodiment of the present invention. In this embodiment, the compositor comprises logic 235 to capture, on a per-video input basis, new frame content for each new frame of graphics information. The compositor 230 comprises inputs for receiving a plurality of video signals (vid1, vid2 . . . vidn) that are output from graphics cards of the plurality of render nodes. In this embodiment, the compositor 230 comprises a plurality of interfaces (210, 220 and 225), wherein each of the individual interfaces is configured to receive one of the plurality of input video signals. In the illustrated embodiment, each interface is similarly constructed, and therefore components of only one interface will be described herein, as it will be understood that the remaining interfaces comprise similar components.

Interface 210 comprises logic 214 that is configured to detect a new frame (or a portion thereof) of graphics information. Consistent with embodiments of the invention, this detection may be performed in any of a variety of ways, including the manner described in copending application Ser. No. 10/899,961 (which was incorporated by reference hereinabove). The interface 210 further comprises a memory area 216 to provide temporary storage for the frame (or a portion thereof) of graphics information newly received over the video signal interface. In an embodiment in which the interface is a DVI interface, the digital content is readily obtained from the video signal and stored directly into a memory storage space.

The compositor 230 further comprises logic 235 that is configured to move the various graphics information stored in the temporary storage area of the various interfaces 210, 220, and 225 into a composite frame buffer 250. In this respect, the logic 235 preferably communicates with each of the interfaces 210, 220 and 225 to ascertain when each interface has received (and stored into its temporary storage space) a new frame of graphics information. Once this has occurred, then contents of the various temporary storage space is communicated to their respective locations (e.g., 252, 254 . . . 256) of the composite frame buffer 450. The information in this frame buffer is used to generate a video signal an output to a display 155, in a manner that is known and understood in a person skilled in the art.

It should be appreciated that the illustration of FIG. 3 has been greatly simplified for purposes of illustration.

Figure 4:
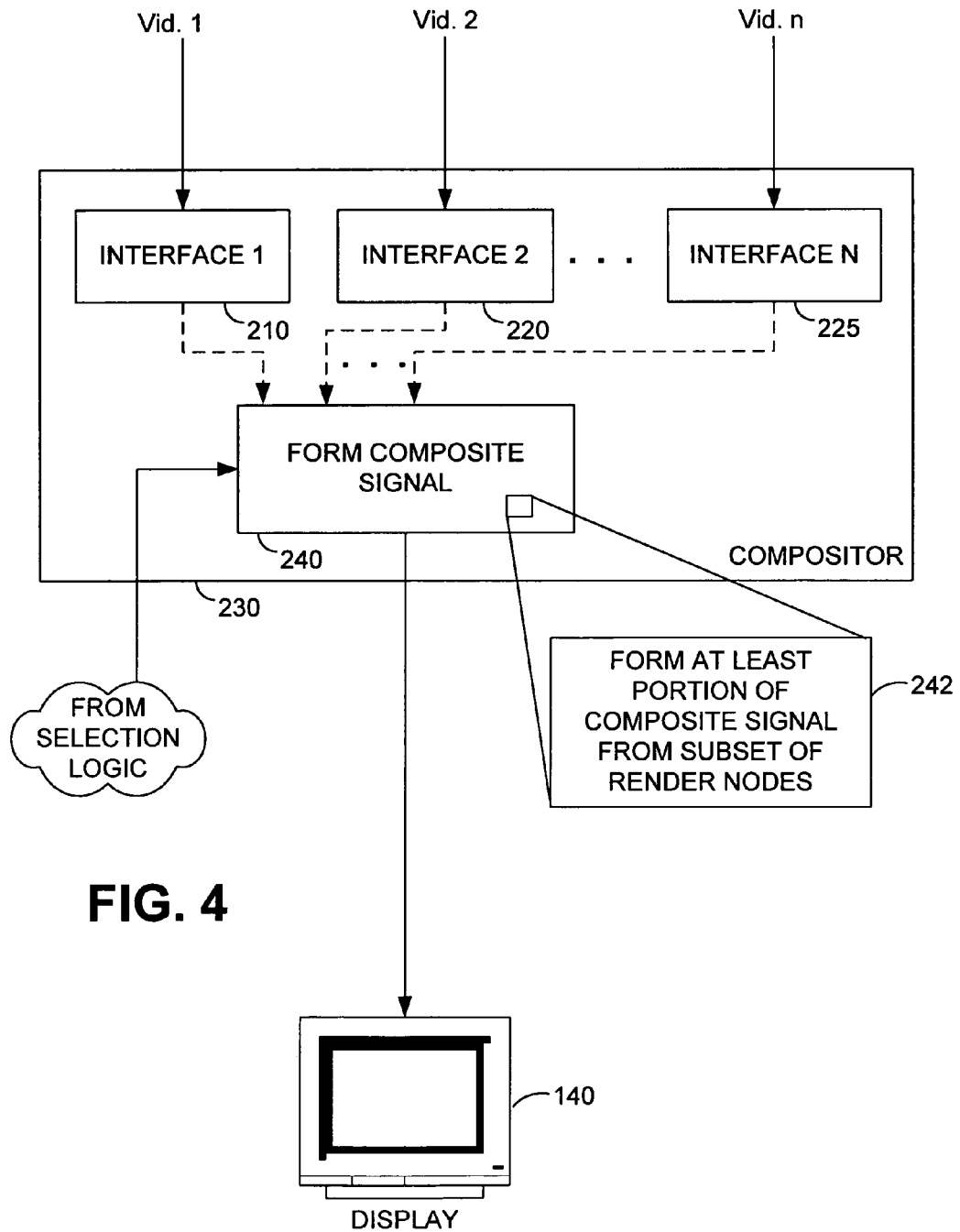
FIG. 4 is a diagram illustrating certain components within a compositor constructed in accordance with another embodiment of the present invention.

Reference is now made to FIG. 4, which illustrates certain components of a compositor 230 constructed in accordance with an embodiment of the invention. As described in connection with FIG. 3, interface circuits or interface logic 210, 220, and 225 are provided in connection with each video signal input for capturing the relevant data from each video input. Logic 240 is also provided to form a composite signal (for output to a display) from the collective data provided at the plurality of interface circuits 210, 220, and 225. Consistent with the scope and spirit of embodiments of the present invention, the logic 240 that forms the composite signal is configured to form a signal that is manifest in at least a portion of a display comprising only video signals input in certain selected or identified inputs. As previously described, one embodiment of the present invention provides for the visual display that is output from a subset of one or more selected or identified render nodes. Render node identifying information is provided to logic 240, which comprises logic 242 that forms the composite signal based only on the video inputs that correspond the selected or identified render nodes. Of course, the user, or person identifying the render nodes for display, may designate the signals from one, two, or any other subset of the render nodes to be displayed.

Similarly, in accordance with another embodiment of the invention, the user may designate the signal from one, two, or any subset of render nodes to be excluded from the display. In such an embodiment, the logic 240 may be configured to ignore the information from the corresponding video input of the compositor 230, and instead form the composite signal based on the video content provided at the other video inputs. The manner in which the compositor does this will depend on how the render nodes are configured (e.g., whether each is configured to fully process a segment of the image, whether each is configured to perform a specified task on the whole image, etc.).

In an alternative embodiment, the system may be configured to automatically designate signals from one or more of the render nodes to be displayed (or eliminated from display). Such an embodiment may have a default mode, which provides such an automatic selection, with the further capability of allowing a user to modify or override the designation.

It should be appreciated that the resulting visual display that is presented to a user, after designation of the subset of render nodes for inclusion or exclusion in the resulting composite signal, may vary based on a number of factors, including the configuration of the system. For example, in one embodiment, a number of render nodes may be configured to each render certain aspects based on physical display partitions. For example, four of the render nodes may be configured such that their respective operation impacts only one quadrant of the display area (e.g., a first render node renders information pertaining only to the upper-right quadrant of the display, a second render node renders information pertaining only to the upper-left quadrant of the display, etc.). Additional render nodes may be configured to perform render operations that impact the entire display. In such a system, if the user designated (for elimination) the render node responsible for render operations that impacted only the upper-right quadrant of the display, a certain blanking would be observed in the upper-right quadrant. If, on the other hand, the user designated (for elimination) a render node responsible for a rendering aspect applicable to the entire display, then a differing visual impact would result.

In one embodiment, logic 240 forms a composite signal such that the selected or identified video inputs (or video inputs corresponding to the subset of selected or identified render nodes) provide a visual display that covers the entire viewing area of the associated display. Consistent with the scope and spirit of the invention, however, embodiments may be configured to generate a composite signal that comprises or embodies the visual presentation of the selected subset within only a portion of the display area (such as a window) overlayed on the display as it would otherwise display the composite image from render nodes. Such an embodiment has a visual presentation similar to a picture-in-picture display, where one of the pictures embodies the visual appearance of a composite signal generated from all render nodes, and the other picture embodies the visual appearance of a composite signal resulting from the designated subset of render nodes (either an aggregate of the designated subset of render nodes, or the image resulting from the aggregate of all render nodes except the designated subset).

Figure 5A:
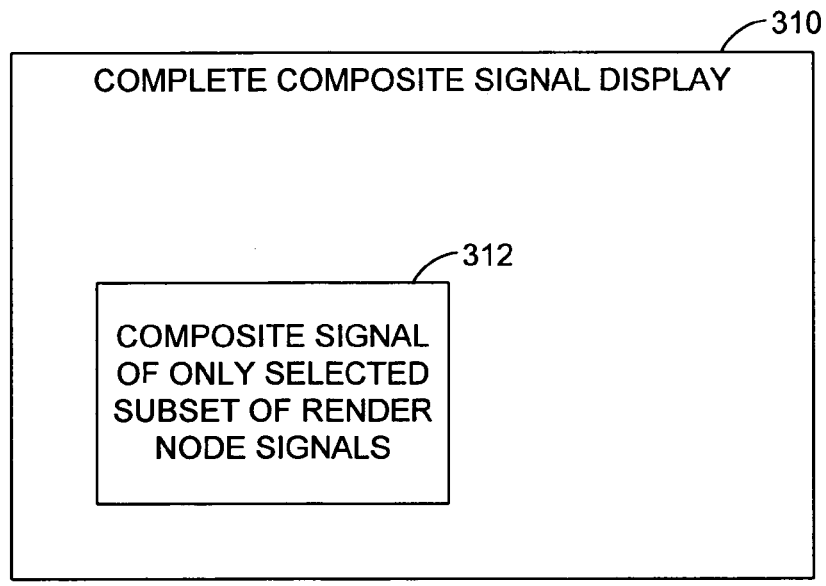
FIG. 5A is a diagram of a display screen illustrating aspects of a display of one embodiment of the present invention.

In this regard, reference is made to FIG. 5A, which illustrates a display 310 in which the compositor generates a composite signal that essentially fills the viewing area of the display 310 with the collective or combined video outputs of all render nodes. In addition, a viewing window 312 is provided in which a visual image generated by the selected subset of the render nodes is displayed. This enables the user convenient and ready comparison between the image within the window 312 as contrasted against the image from all render nodes that fills the entire viewing display 310. Of course, the logic 240 (see FIG. 4) within the compositor 230 generates a composite signal to essentially embed within the composite image the limited or subset signal that corresponds to the selected render nodes.

Similarly, although not specifically illustrated, the window 312 may comprise a collective signal from all render nodes except the render node (or nodes) specifically identified by the user. That is, the window 312 may effectively embody a composite signal excepting (or eliminating) signals from render nodes that are specifically identified by the user (within the subset) to be excluded.

Figure 5B:
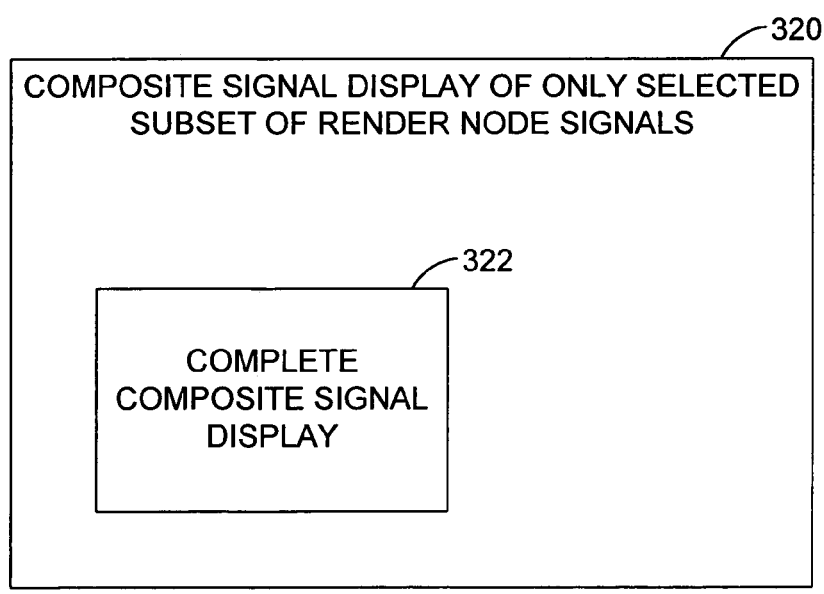
FIG. 5B is a diagram similar to FIGA. 5, illustrating a display in accordance with another embodiment of the present invention.

In a similar embodiment (see FIG. 5B), the images may be the substantial inverse of those illustrated in FIG. 5A. That is, the complete composite signal embodying all render nodes may be displayed in a window 332, while the effective composite signal of the subset of selected (or excluded) render nodes is displayed across the entire display area 330. In either embodiment of FIG. 5A or 5B, the resulting visual display allows a user to readily (visually) compare the results of the entire composite display (encompassing all render nodes) with a display that results from only a designated subset of render nodes being display (or excluded from the composite display).

As described herein, embodiments of the present invention can be varied. A central feature of most embodiments is the ability of a user (e.g., one troubleshooting the operation of a graphics system, or otherwise seeking to evaluate a performance aspect in a graphics system) to either specifically select or deselect one or more render nodes from the composited/displayed output. Unlike console manager troubleshooting, this enables a user to directly see the effects that each individual render node has on the graphical output. For example, if an overall graphics image has a red hue or tint to the image, by individually selecting or deselecting each render node from the composited signal, the user can identify the troubled render node by identifying the render node that is selected (or deselected) when the red hue is removed from the image.

Consistent with embodiments of the invention, there are a variety of ways in which this information may be visually presented to the user. As described above, the visual display may be presented across the entire display, or alternatively may be presented in a window of a display.

Figure 6:
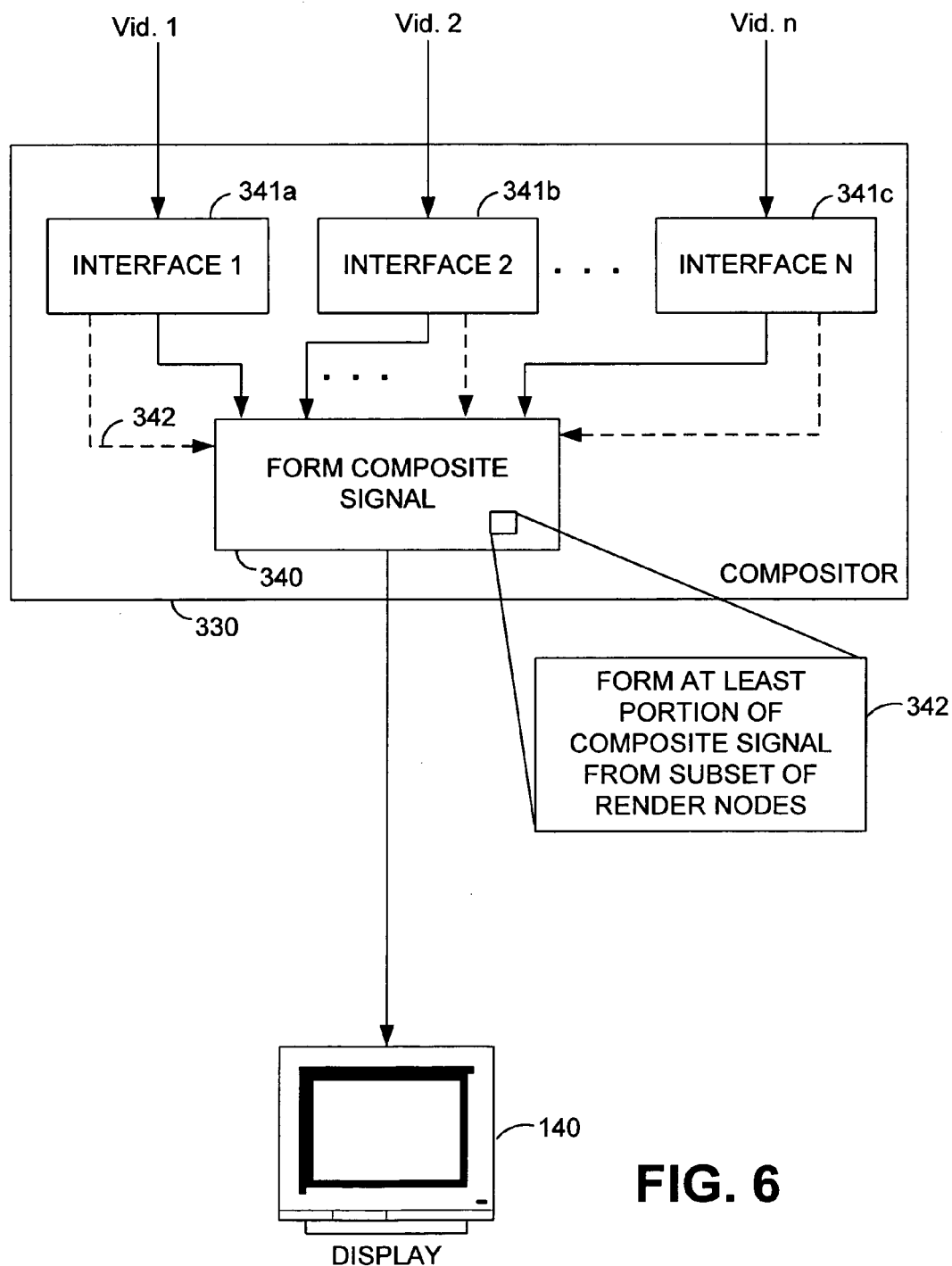
FIG. 6 is a diagram, similar to FIG. 4, illustrating certain components of a compositor constructed in accordance with another embodiment of the present invention.

Reference is now made to FIG. 6, which is a diagram similar to FIG. 4, illustrating a compositor 330. The principle function of the compositor 330 is similar to the compositors of other embodiments of the invention. In accordance with the illustrated embodiment, however, the selection or identification of the subset of render nodes to be utilized in generating the composite image, may be communicated to the compositor through the respective video inputs. In the embodiments previously illustrated herein, the master node 110 or selection node 160 communicated the selection or identification of the render nodes to the compositor via a dedicated interface or communication channel; however, the node selection/identification information could be embedded in the video signals that are delivered to the compositor 340. As previously noted, the video signals are communicated to the compositor via a digital video interface (DVI). There are a variety of ways in which additional information may be embedded within these digital signals and communicated to the compositor. Therefore, in FIG. 6 dash lines (e.g., 342) are illustrated between the interfaces 341a, 341b and 341c and the logic 340 for forming the composite signal. These dashed lines 342 represent a path or channel over which information may be communicated to logic 340 to indicate whether the associated input is to be included in the visual display.

Figure 7:
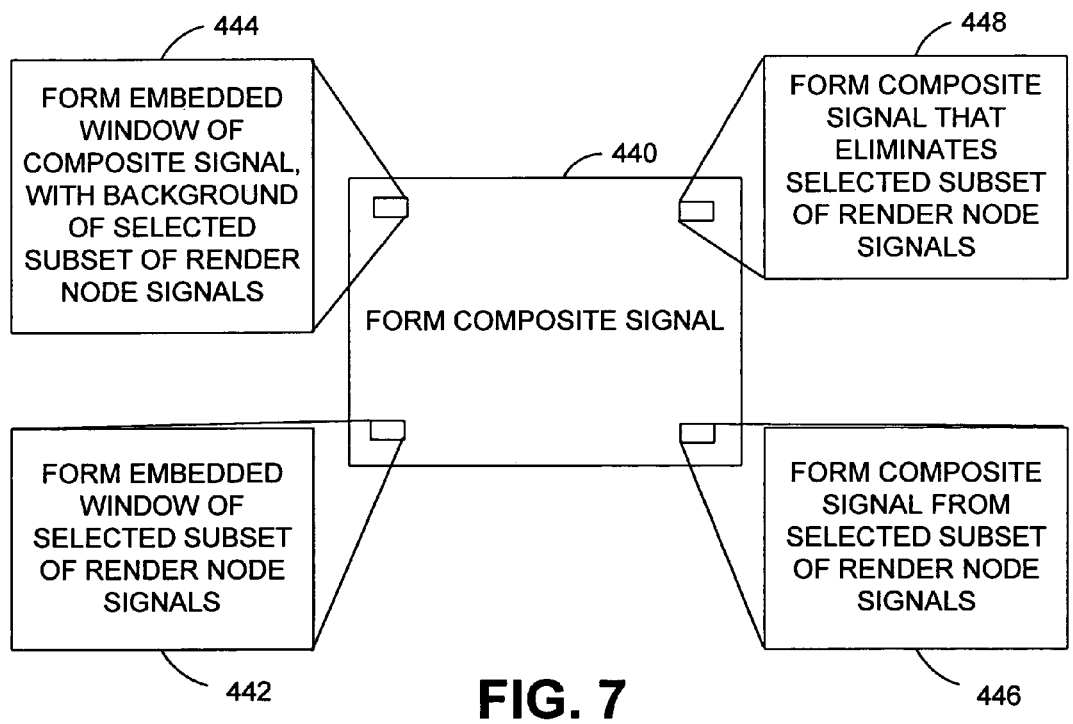
FIG. 7 is a diagram illustrating certain components within a compositor constructed in accordance with various embodiments of the present invention.

Reference is now made to FIG. 7, which is a diagram illustrating certain components within logic 440 of a compositor constructed in accordance with various embodiments of the invention. The logic 440 of FIG. 7 loosely corresponds to the logic 240 illustrated in FIG. 4. The logic 440, in various embodiments, comprises one or more of the components illustrated in FIG. 7. For example, a portion or segment of the logic 440 may comprise logic 442 for forming an embedded window comprising a combination or composite of the video output of a subset of the selected render nodes. This embedded window may form only a portion of a visual display that otherwise effectively displays a composite display comprising the combination of all participating render nodes. Logic 440 may also comprise a component or segment 444 that forms an embedded window comprising the visual display of all participating render nodes, effectively overlaid over a background of the entire display area comprised of only a selected subset of render nodes. Similarly, in certain embodiments, the logic 440 may comprise a portion or segment 446 that forms a composite signal for covering an entire viewing area of a display consisting of only the video outputs of a selected subset of render nodes. Similarly, embodiments may comprise a segment or portion 448 that forms a composite signal for presenting an entire viewing area of a display with the effective composite signal of all render nodes except the particular subset of selected or identified render nodes (for exclusion from the composite signal).

It should be appreciated that the various segments or portions 442, 444, 446, and 448 of FIG. 7 may be selectively combined in various embodiments of the invention. Indeed, in some embodiments, all of these segments may be present, giving the user more flexible and robust options for displaying graphic images generated by the various render nodes in the system.

Figure 8:
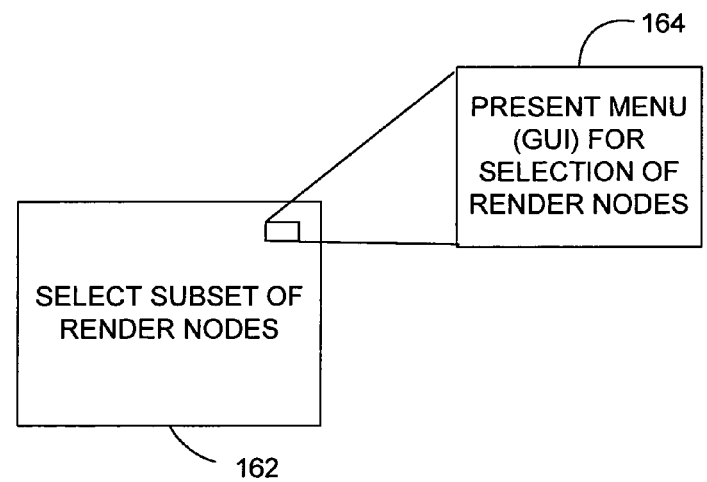
FIG. 8 is a diagram illustrating certain logic associated with a node used by a system administrator or user.

Reference is now made to FIG. 8, which is a diagram illustrating selection logic 162. Such selection logic 162 was illustrated in FIG. 2 as being associated with a separate or dedicated selection node 160. In accordance with other embodiments of the invention, the selection logic 162 may be associated with any node in the system, comprising the master node or any of the render nodes. In one embodiment, the selection logic 162 comprises logic 164 for presenting a user with user-friendly interface for manually identifying or selecting one or more render nodes to comprise a subset of the render nodes for selection (or elimination) in a composite signal to be viewed on a display. Such interface enables easy or convenient selection or identification of the desired subset of render nodes.

Figure 9:
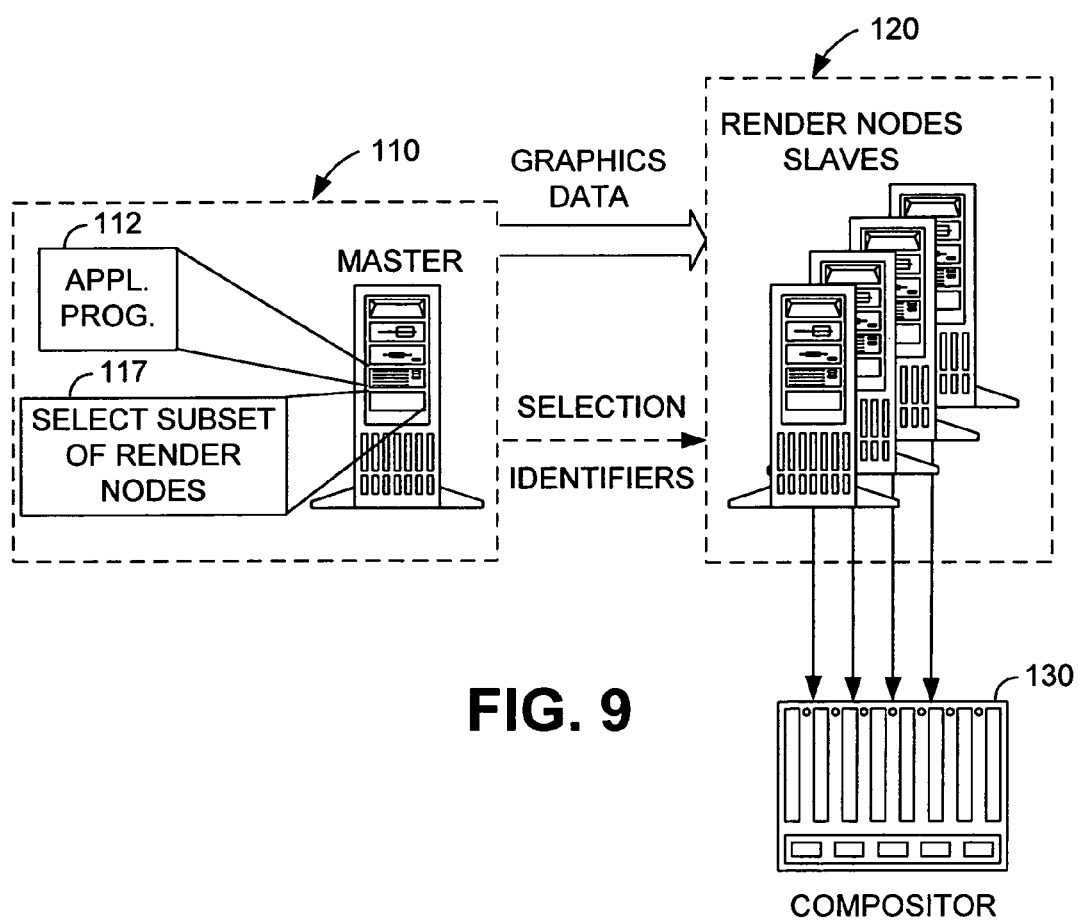
FIG. 9 is a diagram illustrating certain features of an embodiment of the present invention, in which graphics data and render node selection identifiers are communicated between a selection node and a plurality of render nodes.

Reference is now made to FIG. 9, which is a diagram illustrating communication between a master node 110 and a plurality of render nodes 120. Graphics data is communicated from the master node 110 to the render nodes 120 for three-dimensional rendering operations. In addition, identification of render nodes selected for visual output may also be communicated from the master 110 to the render nodes 120. Such an embodiment would be appropriate in connection with a compositor such as that illustrated in FIG. 6. By communicating to each of the render nodes whether its output is to form a part of the composite display or not, the respective render nodes 120 may then communicate this information to the compositor 340. In an alternative embodiment, if the master node 110 (or selector node 160) communicates to a particular render node that the render node is not to form a part of the composite output, then the relevant render node (which is not to form part of the output) may generate an appropriate output signal (e.g., blank) for delivery to the compositor. In such an embodiment, a conventional compositor could be used because the relevant video signals would be independently generated by each render node. It should be appreciated that embodiments of the present invention may be implemented on systems using conventional and unaltered render nodes, with a specifically altered compositor. Alternatively, embodiments of the present invention could be implemented on a system having a conventional compositor, with specifically altered or modified render nodes.

Figure 10:
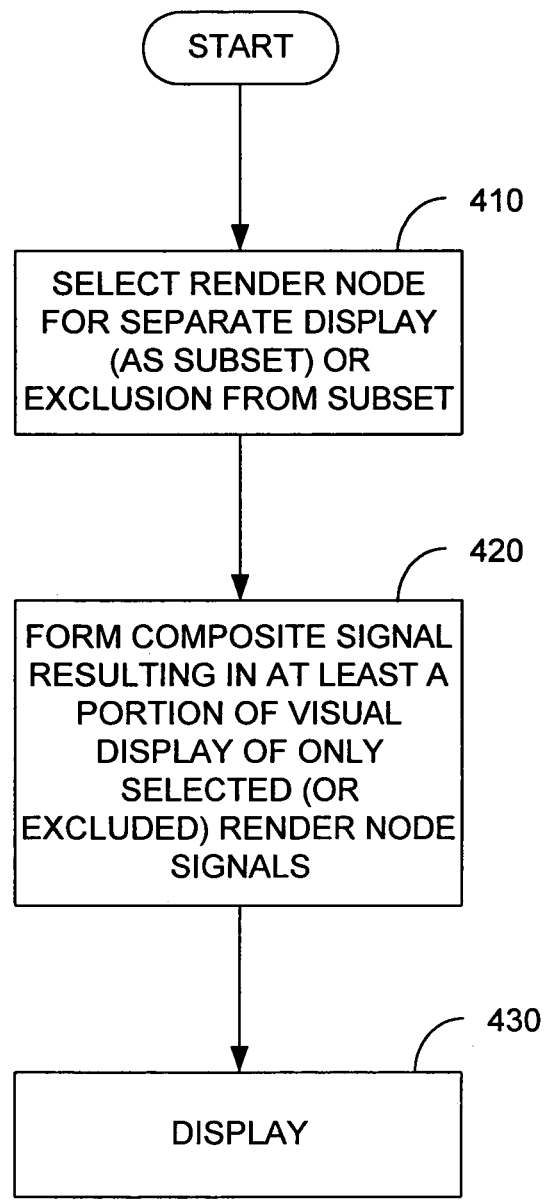
FIG. 10 is a flow chart illustrating the top-level functional operation of an embodiment of the present invention.

Reference is now made to FIG. 10, which is a flow chart illustrating the top-level functional operation of an embodiment of the present invention. In operation, the illustrated embodiment at 410 provides for the selection or identification of one or more render nodes for separate display (or exclusion) in a video display (or portion thereof).

After specific render nodes are selected or identified for inclusion (or exclusion), the method forms a composite signal that causes visual display (in at least a portion of a display) of the collective content of only the selected render nodes. Alternatively, the composite signal may be formed from the video content output from each render node, excluding the content from one or more render nodes that are specifically selected or identified for exclusion (420). Finally, the resultant composite signal is delivered to a display that provides a corresponding visual display to a user (430).

Although a variety of particular embodiments have been described herein, it should be appreciated that the embodiments of the present invention provide a very robust and powerful system for evaluating the effects of various performance parameters (that are visually discernable) in a three-dimensional computer graphics system.

What is claimed is:

1. A multi-node computer graphics system comprising:
a master computer capable of executing a graphics application;
a plurality of render nodes configured to collectively render a graphics image in response to graphics data communicated from the master computer;
a compositor configured to receive a plurality of video signals output from the plurality of render nodes and generate a composite output signal of the plurality of video signals, wherein the multi-node graphics system comprises selection logic executable by the multi-node graphics system to facilitate a user to specify at least one render node to contribute to the composite output signal from the compositor, wherein the compositor to receive via a video signal from the plurality of render nodes an identification of the at least one render node specified by the user, wherein the multi-node graphics system to include in the composite output signal only content from the at least one render node specified by the user via the selection logic, and wherein the compositor to eliminate from the composite output signal, content from video signals from the render nodes not specified by the user.

2. The system of claim 1, wherein the master computer comprises the selection logic, and wherein the master computer to communicate through a network to the plurality of render nodes an identification of the at least one render node selected by the user via the selection logic.

3. The system of claim 1, comprising a selection node comprising a computer having the selection logic.

4. The system of claim 1, wherein the selection logic comprises a user-interface that facilitates the user to specify more than one render node comprising a subset of the plurality of render nodes to contribute to the composite output signal generated by the compositor.

5. The system of claim 1, wherein the master computer to communicate to the compositor an identification of the at least one render node specified by the user via the selection logic.

6. The system of claim 5, wherein the master computer to directly communicate the identification to the compositor.

7. The system of claim 5, wherein the master computer to indirectly communicate the identification to the compositor via at least one render node of the plurality of render nodes.

8. The system of claim 1, wherein the compositor is configured to generate the composite output signal such that a composite video signal of only video signals from the at least one render node specified by the user is displayed across an entire display area of a display.

9. The system of claim 1, wherein the compositor is configured to generate the composite output signal such that a composite video signal of only video signals from the at least one render node specified by the user is displayed within a picture-in-picture window of a display.

10. A multi-node computer graphics system comprising:
a master computer capable of executing a graphics application and to communicate graphics data to a plurality of render nodes;
the plurality of render nodes configured to collectively render a graphics image in response to the graphics data communicated from the master computer;
a compositor configured to receive a plurality of video signals output from the plurality of render nodes and generate a composite output signal; and
selection logic executable by the multi-node graphics system to facilitate a user to specify at least one render node of the plurality of render nodes for selection, wherein the compositor to form the composite output signal comprising content from only the at least one render node specified by the user for selection, wherein the compositor to receive, via at least one video signal of the plurality of video signals from the plurality of render nodes, an identification of the at least one render node specified by the user for selection, and wherein the compositor to eliminate from the composite output signal, content from video signals from the render nodes not specified by the user.

11. The system of claim 10, wherein the master computer comprises the selection logic comprising a user-interface to facilitate the user to specify the at least one render node for selection and wherein the master computer to communicate to the plurality of render nodes the identification of the at least one render node specified by the user for selection.

12. A multi-node computer graphics system comprising:
a master computer capable of executing a graphics application;
a plurality of render nodes configured to collectively render a graphics image in response to graphics data communicated from the master computer;
selection logic that configures the multi-node computer graphics system to receive a user selection of at least one render node of the plurality of render nodes for viewing and to provide an identification of the at least one render node to a compositor;
the compositor configured to receive a plurality of video signals output from the plurality of render nodes and generate a composite output signal of the plurality of video signals, and to receive via at least one of the plurality of video signals the identification of the at least one render node selected by the user and modify the output signal to eliminate content received from the at least one render node selected by the user; and
a display configured to present a visual display corresponding to the composite output signal.

13. The system of claim 12, wherein the master computer comprises the selection logic for identifying the at least one render node for selection.

14. The system of claim 12, wherein the master computer to communicate the identification of the at least one render node for viewing to the plurality of render nodes.

15. A compositor for a graphics system comprising:
a plurality of inputs configured to receive video signals output from a plurality of render nodes, wherein the compositor is configured via a hardware processor and memory storing instructions executable by the hardware processor to:
receive via at least one of the video signals from the plurality of render nodes, an identification of a subset of the plurality of render nodes selected by a user; and
generate a composite video signal containing video signal content from only the identified subset of the plurality of render nodes selected by the user, and to eliminate from the composite video signal, content from video signals from render nodes not selected by the user.

16. The compositor of claim 15, wherein the identified subset is a single render node of the plurality of render nodes.

17. A method for evaluating operation of a multi-node computer graphics system, the method comprising:
receiving from a user to the multi-node computer graphics system comprising render nodes, a selection of a desired subset of the render nodes for providing a visual display;
communicating via a video signal comprising a video signal output from one of the render nodes to a compositor, an identification of the subset of the render nodes;
presenting via the compositor, on at least a portion of a display, the visual display corresponding to a composite signal of video signals output from the subset of the render nodes, the compositor eliminating from the composite signal, content from video signals from render nodes not specified by the user.

18. The method of claim 17, wherein the presenting comprises generating the composite signal by the compositor, wherein the composite signal represents graphic content from only the subset of render nodes, and wherein the subset of render nodes is fewer than all render nodes in the multi-node computer graphics system configured to collectively render a graphics image.

19. A method for evaluating operation of a multi-node computer graphics system having render nodes for providing a visual display, the method comprising:
receiving, via a user-interface of the multi-node computer graphics system, a user-selection of a subset of the render nodes;
identifying the subset to a compositor via at least one video signal from the render nodes to the compositor;
presenting, on at least a portion of a display, the visual display corresponding to a composite signal of video signals output from render nodes not including the subset, the compositor eliminating from the composite signal, content from the subset.

20. A method of troubleshooting a graphics system having multiple render nodes, the method comprising:
generating via a compositor a composite video signal of video signal content from the multiple render nodes;
receiving at the graphics system a selection by a user of a render node of the multiple render nodes;
identifying the render node selected by the user to the compositor via a video signal from the render nodes to the compositor; and
generating via the compositor a modified composite video signal not including video signal content from the render node selected by the user, wherein generating the modified composite video signal comprises the compositor eliminating from the composite video signal the video signal content from the render node selected by the user.

* * * * *